UNITED STATES PATENT OFFICE.

HENRY D. BOSTOCK, OF JACKSONVILLE, FLORIDA.

EGG-PRESERVING COMPOUND.

1,212,445. Specification of Letters Patent. Patented Jan. 16, 1917.

No Drawing. Application filed June 13, 1916. Serial No. 103,559.

*To all whom it may concern:*

Be it known that I, HENRY D. BOSTOCK, a citizen of the United States, residing at Jacksonville, in the county of Duval and State of Florida, have invented certain new and useful Improvements in Egg-Preserving Compounds; and I do hereby declare the following to be a full, clear, and exact description of the invention, such as will enable others skilled in the art to which it appertains to make and use the same.

This invention relates to certain new and useful improvements in egg preserving compounds and to this end the same consists in the use of a plant commonly known as beggarweed, the scientific name of which is *Desmodium tortuosum meibomia.*

I have discovered that this plant possesses wonderful egg preserving qualities, whether the plant is used in the dried form or in solution.

The present invention relates to the use of the *Desmodium tortuosum meibomia* in liquid form. To this end, the same consists in the use of a solution produced by the saturation of the plant in water, the eggs to be preserved being immersed in a solution of preferably one pound of dried *Desmodium tortuosum meibomia* to one gallon of water.

Having thus described my invention, what I claim to be new is:—

The process of preserving eggs, the same consisting in immersing the eggs in a solution of *Desmodium tortuosum meibomia* in proportions of substantially one pound of *Desmodium tortuosum meibomia* to one gallon of water.

In testimony whereof I hereunto affix my signature in presence of two witnesses.

HENRY D. BOSTOCK.

Witnesses:
JOHN T. STEPHENS,
O. B. STEPHENS.

Copies of this patent may be obtained for five cents each, by addressing the "Commissioner of Patents, Washington, D C."